(12) United States Patent
Porter

(10) Patent No.: US 6,429,416 B1
(45) Date of Patent: Aug. 6, 2002

(54) APPARATUS AND METHOD OF CONTROLLING A GATED POWER SUPPLY IN AN IMAGE INTENSIFIER WITH A MICRO-CHANNEL PLATE

(75) Inventor: Jerry D. Porter, Dallas, TX (US)

(73) Assignee: Northrop Grunman Corporation, Los Angeles, CA (US)

( * ) Notice: Subject to any disclaimer, the term of this patent is extended or adjusted under 35 U.S.C. 154(b) by 0 days.

(21) Appl. No.: 09/494,992

(22) Filed: Jan. 31, 2000

(51) Int. Cl.$^7$ ................................................ H01J 40/14
(52) U.S. Cl. .......................... 250/214 VT; 250/214 B; 313/103 CM
(58) Field of Search ............................ 250/214 VT, 207, 250/214 AL, 214 B; 313/524, 525, 528, 529, 103 R, 103 CM, 105 CM; 315/12.1

(56) References Cited

U.S. PATENT DOCUMENTS

| | | | |
|---|---|---|---|
| 3,860,823 A | 1/1975 | Luitwieler, Jr. et al. | 250/369 |
| 3,864,595 A | 2/1975 | Lawrence et al. | 315/12 |
| 3,868,536 A * | 2/1975 | Enck, Jr. | 313/528 |
| 5,801,517 A | 9/1998 | Borle | 323/107 |
| 5,959,668 A | 9/1999 | Cryder et al. | 348/229 |

OTHER PUBLICATIONS

International Search Report in PCT International Application No. PCT/US00/34588, dated Apr. 20, 2001.

* cited by examiner

Primary Examiner—Que T. Le
Assistant Examiner—Kevin Pyo
(74) Attorney, Agent, or Firm—Baker Botts L.L.P.

(57) ABSTRACT

Apparatus for controlling a gated power supply of an image intensifier having a micro-channel plate includes a current-to-voltage converter coupled to the micro-channel plate operable to convert a strobing current on the micro-channel plate to a strobing voltage signal, a AC-to-DC converter coupled to the current-to-voltage converter operable to convert the flickering voltage signal to a voltage level signal, and a control circuit coupled to the AC-to-DC converter operable to generate a varying frequency gating control signal in response to the frequency of the strobing current. The gating frequency is gradually changed until the flickering is substantially eliminated.

24 Claims, 2 Drawing Sheets

APPARATUS AND METHOD OF CONTROLLING A GATED POWER SUPPLY IN AN IMAGE INTENSIFIER WITH A MICRO-CHANNEL PLATE

TECHNICAL FIELD OF THE INVENTION

This invention is related in general to the field of optical devices. More particularly, the invention is related to apparatus and method of controlling a gated power supply in an image intensifier with a micro-channel plate.

BACKGROUND OF THE INVENTION

There are many industrial and military applications of image intensifiers for sensing and amplifying radiation images of low intensity. Typical image intensifier devices employ micro-channel plates for multiplying an electron image corresponding to the sensed radiation image. More specifically, such devices include a photocathode for converting the incident radiation image into a corresponding electron image, which is multiplied by the micro-channel plate (MCP). The multiplied electron image is directed onto a phosphorous screen for providing an intensified display of the sensed radiation image. The gain is achieved by the micro-channel plate, which typically includes many channels or passages, each presenting secondary electron emissive surfaces. As the electrons of the image are directed through the channels, they repeatedly collide with the secondary emissive surfaces and their numbers multiply as a result.

Image intensifier tubes employing micro-channel plates are subject to saturation in the displayed output image when the intensity of the output image exceeds its operating range. Operation of the micro-channel plate image intensifier in the saturated region causes the gain within the bright areas of the displayed image to be significantly lower than that of the dark areas, thereby destroying image contrast. Additionally, saturation also ruins the focus and causes image distortion. Gating the power supply is a conventional solution used to vary the effective duty cycle and therefore the gain of the image intensifier to avoid saturation.

However, image intensifier devices using gated power supplies suffer from a flickering or strobing effect. When a periodically modulated ambient light source, such as fluorescent light, is present, an undesirable beat frequency results if the power supply is gated at a multiple or sub-multiple of the light frequency.

SUMMARY OF THE INVENTION

Accordingly, there is a need for preventing the undesirable flickering effect caused by an ambient periodically modulated light interfering with the gated power supply frequency. In accordance with the present invention, apparatus and a method are provided which eliminates or substantially reduces the disadvantages associated with prior circuits.

In one aspect of the invention, apparatus for controlling a gated power supply of an image intensifier having a micro-channel plate includes a current-to-voltage converter coupled to the micro-channel plate operable to convert a strobing current on the micro-channel plate to a strobing voltage signal, a AC-to-DC converter coupled to the current-to-voltage converter operable to convert the flickering voltage signal to a voltage level signal, and a control circuit coupled to the AC-to-DC converter operable to generate a varying frequency gating control signal in response to the frequency of the strobing current.

In another aspect of the invention, apparatus for controlling a gated power supply of an image intensifier having a micro-channel plate includes a current-to-voltage converter coupled to the micro-channel plate operable to convert a strobing current on the micro-channel plate to a strobing voltage signal, a AC-to-DC converter coupled to the current-to-voltage converter operable to convert the flickering voltage signal to a voltage level signal, and an oscillator coupled to the AC-to-DC converter operable to generate a gating control signal in response to the voltage level signal, the gating control signal changing the gated power supply frequency to substantially minimize the strobing current.

In yet another aspect of the invention, a method of gating a power supply of a photocathode in an image intensifier having a micro-channel plate, includes the steps of sensing a strobing current in the micro-channel plate, and gradually varying the gating frequency of the gated power supply until the strobing current is substantially eliminated.

The present invention is operable to minimize or substantially eliminate the undesirable flickering caused by the beat frequency created between the gated power supply frequency and a periodically modulated ambient light, such as fluorescent light or the light from a computer monitor. The present invention, upon detection of the flickering, gradually changes the photocathode power supply frequency until the flickering is eliminated.

BRIEF DESCRIPTION OF THE DRAWINGS

For a better understanding of the present invention, reference may be made to the accompanying drawings, in which.

DETAILED DESCRIPTION OF THE INVENTION

Figure 1:
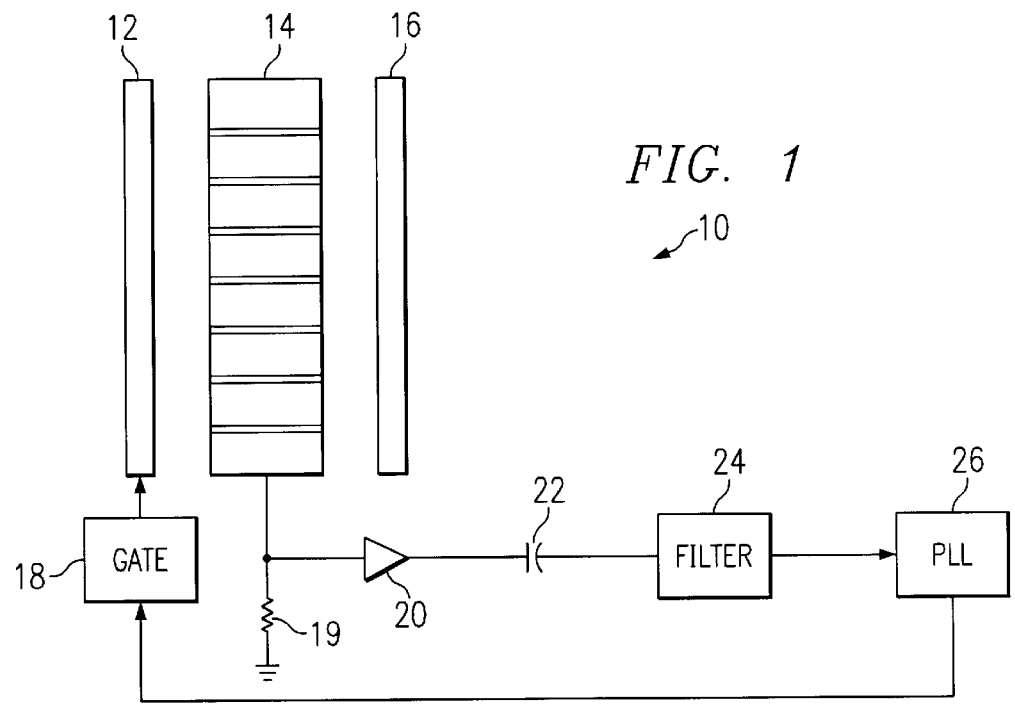
FIG. 1 is a schematic diagram of an embodiment of a circuit for controlling a gated power supply for an image intensifier with a micro-channel plate constructed according to the teachings of the present invention.

FIG. 1 is a schematic diagram of an embodiment of a circuit 10 for controlling a gated power supply for an image intensifier with a micro-channel plate constructed according to the teachings of the present invention. The image intensifier includes a photocathode 12, which is coupled to a micro-channel plate 14. Micro-channel plate 14 is fabricated from conductive glass and has many micro-channels that have secondary electron emission surfaces, which multiplies the number of electrons received from photocathode 12. A phosphor screen 16 is coupled to micro-channel plate 14 to receive the multiplied electrons and to convert the electrons to photons. A one-shot gate 18 is coupled to photocathode 12 to generate a pulse of specified duration whenever its input triggered.

Micro-channel plate 14 is coupled to ground via a resistive element 19. Resistive element 19 is further coupled to an amplifier 20, which is coupled to a capacitive element 22 and a filter 24. The amplified signal is A.C. coupled across capacitive element 22 and filtered by a bandpass or lowpass filter 24. The output of filter 24 is coupled to a phase-locked loop (PLL) 26, the oscillating output of which is used to control the drive pulse frequency generated by gate 18. It is well known that phase-locked loop circuits typically include a phase detector (not shown), a lowpass filter (not shown), and a voltage-controlled oscillator (not shown), which enables the phase-locked loop to lock the oscillator output in phase and track the frequency of the input signal.

In operation, photocathode 12 is typically biased at approximately −500 to −800 volts. Light striking photocathode 12 generates electrons, which impinge on micro-channel plate 14. The number of electrons, through secondary emission via the surfaces of the micro-channels, is multiplied. The current in micro-channel plate 14 varies with ambient light. When the ambient light is a periodically modulated light, the current of micro-channel plate 14 varies in time with the ambient light. When the periodically modulated light has a frequency that is a multiple or sub-multiple of the photocathode gating frequency, a beat frequency is created that is evident in the micro-channel plate current. The result is strobing or flickering in the resultant image. However, with the circuit shown in FIG. 1, the flickering effect is minimized. The current in micro-channel plate 14 is converted to a voltage signal by resistive element 19, and then amplified by amplifier 20 and A.C. coupled across capacitor 22 before it is filtered by filter 24 to remove certain high frequency components. The filtered voltage signal is provided to phase-locked loop 26, which locks onto the frequency of the filtered voltage signal and generates a trigger output to the one-shot gate. The result is that the one-shot gate generates a pulse having a gradually varying frequency according to the frequency of the ambient light.

Figure 2:
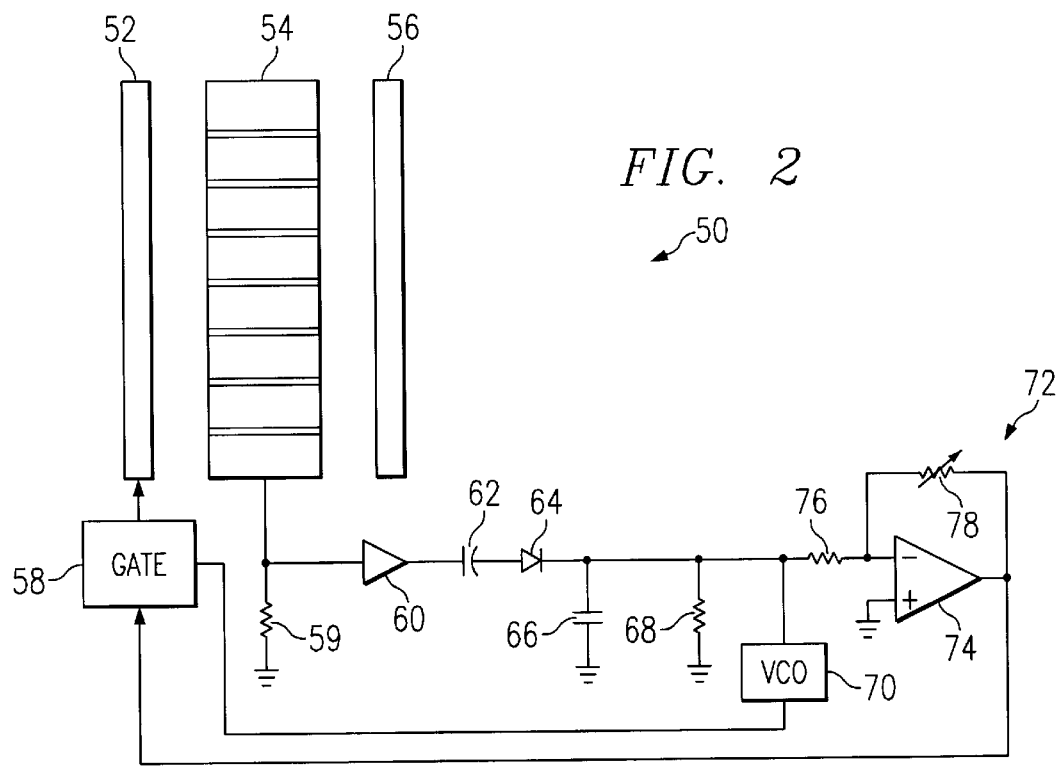
FIG. 2 is a schematic diagram of another embodiment of a circuit for controlling a gated power supply for an image intensifier with a micro-channel plate constructed according to the teachings of the present invention.

FIG. 2 is a schematic diagram of another embodiment of a circuit 50 for controlling a gated power supply for an image intensifier with a micro-channel plate constructed according to the teachings of the present invention. The image intensifier includes a photocathode 52, which is coupled to a micro-channel plate 54. Micro-channel plate 54 multiplies the number of electrons received from photocathode 52. A phosphor screen 56 is coupled to micro-channel plate 54 to receive the multiplied electrons and to convert the electrons to photons. A one-shot gate 58 is coupled to photocathode 52 to generate the power supply pulses.

Micro-channel plate 54 is coupled to ground via a resistive element 59. Resistive element 59 is further coupled to an amplifier 60, which is coupled to a capacitive element 62 and a diode 64. Parallel-coupled second capacitive element 66 and a second resistive element 68 couple the cathode of diode 64 to ground. The cathode of diode 64 is further coupled to a voltage-controlled oscillator (VCO) 70 and an amplifier circuit 72. Amplifier circuit 72 includes an operational amplifier 74 with a resistive element 76 coupled to its inverting input and its non-inverting input is coupled to ground. A variable resistive element 78 is coupled between its inverting input and the output. The gain of amplifier 74 can be varied by varying the resistive value of resistor 78. The output of amplifier circuit 72 is coupled to the input of one-shot gate 58, which also receives the output from voltage-controlled oscillator 70.

In operation, the current in micro-channel plate 54 varies in time with the frequency of periodically modulated ambient light. The current in micro-channel plate 54 is converted to a voltage signal by resistive element 59, and then amplified by amplifier 60 and A.C. coupled across capacitor 62. Diode 64, capacitor 62 and resistor 68 function as an integrator to convert the A.C. flicker present at the cathode of diode 64 to a D.C. voltage level, which is provided to voltage-controlled oscillator 70. Amplifier circuit 72 is operable to adjust the gain for optimum gate driving pulse width. As flickering is experienced, the voltage at the cathode of diode 64 decreases, which causes the output of voltage-controlled oscillator 70 to trigger one-shot gate 58 to produce pulses of gradually changing frequency until no flickering is detected.

Figure 3:
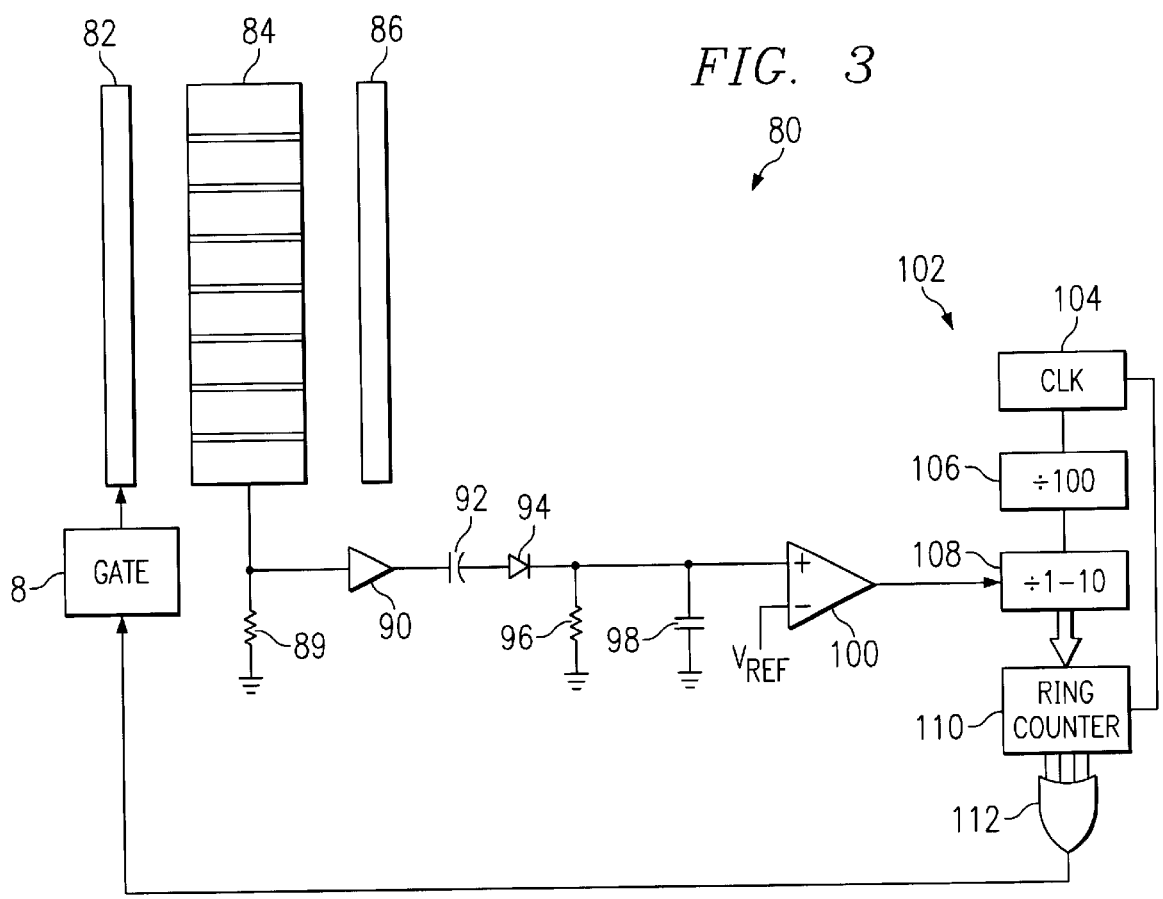
FIG. 3 is a schematic diagram of yet another embodiment of a circuit for controlling a gated power supply for an image intensifier with a micro-channel plate constructed according to the teachings of the present invention.

FIG. 3 is a schematic diagram of yet another embodiment of a circuit 80 for controlling a gated power supply for an image intensifier with a micro-channel plate constructed according to the teachings of the present invention. Circuit 80 employs digital circuitry to vary the period of the gating frequency or to time-shift the gate driving pulses. The image intensifier includes a photocathode 82, which is coupled to a micro-channel plate 84. Micro-channel plate 84 multiplies the number of electrons received from photocathode 82. A phosphor screen 86 is coupled to micro-channel plate 84 to receive the multiplied electrons and to convert the electrons to photons. A one-shot gate 88 is coupled to photocathode 82 to generate power supply pulses to drive the photocathode.

Micro-channel plate 84 is coupled to ground via a resistive element 89. Resistive element 89 is further coupled to an amplifier 90, which is coupled to a -capacitive element 92 and a diode 94. Parallel-coupled second capacitive element 96 and second resistive element 98 couple to the cathode of diode 94 to ground. The cathode of diode 94 is further coupled to a comparator 100. The diode cathode is coupled to the non-inverting input of comparator 100. The inverting input of comparator 100 is coupled to a reference voltage, which may be one-half of the supply voltage level, for example. The output of comparator 100 is coupled to a digital control circuit 102. Digital control circuit 102 includes a clock circuit 104, which generates a clock signal having a predetermined clock rate, for example, 400 to 600 Hz. Clock circuit 104 is coupled to a divide-by-100 counter 106 and a decade counter 108. The output of decade counter 108 is coupled to a ring counter 110, the output of which is coupled to an OR gate 112. The output from operational amplifier 100 is coupled to decade counter 108. The output of OR gate 112 is coupled to gate 88.

Figure 4:
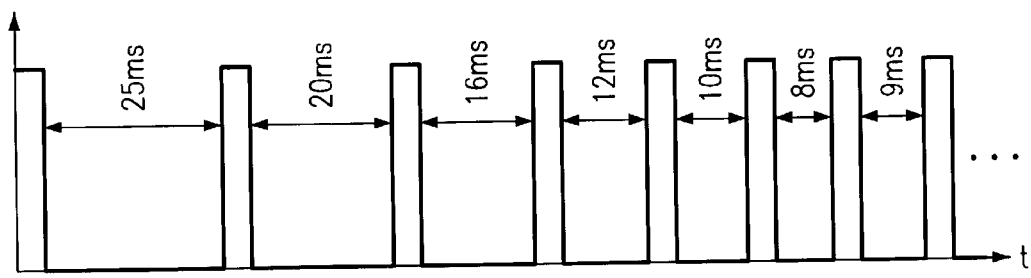
FIG. 4 is a timing diagram of variable period gating pulses for controlling the power supply constructed according to the teachings of the present invention.

In operation, the current in micro-channel plate 84 varies in time with the frequency of periodically modulated ambient light. The current in micro-channel plate 84 is converted to a voltage signal by resistive element 89, and then amplified by amplifier 90 and A.C. coupled across capacitor 92. Diode 94, capacitor 98 and resistor 96 function as an integrator to convert the A.C. flicker present at the cathode of diode 94 to a D.C. voltage level, which is provided to comparator 100. The flicker generated D.C. signal toggles comparator 100, which in turn enables decade counter 108 to change its output count bits. The output count bits of decade counter 108 are provided to a ring counter 110. The output of ring counter 110 is OR'd and provided to one-shot gate 88 to trigger the generation of power supply pulses. Referring to FIG. 4, a timing diagram of variable period gating pulses for controlling the power supply according to the present invention is shown. It may be seen that the pulse spacing in time is slightly changed while maintaining the same pulse width until flickering is eliminated or minimized. The pulses are shifted in time to increase or decrease the period. Circuit 80 may incrementally decrease the pulse spacing until a predetermined limit and then incrementally increase the pulse spacing until the beat frequency is eliminated. The pulse spacing stays constant if flickering is no longer present.

By employing the present invention, the strobing or flickering due to beat frequency created between the photocathode power supply gate frequency and a periodically modulated ambient light is eliminated or minimized by varying the gating frequency. The present invention employs circuits to detect the strobing effect and to cause the gate frequency to change until the strobing is eliminated or minimized.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. Apparatus for controlling a gated power supply of an image intensifier having a micro-channel plate, comprising:
    a current-to-voltage converter coupled to the micro-channel plate operable to convert a current on the micro-channel plate to a voltage signal;
    a AC-to-DC converter coupled to the current-to-voltage converter operable to convert the voltage signal to a voltage level signal; and
    a control circuit coupled to the AC-to-DC converter operable to change the frequency of a gating control signal in response to a strobing of the current.

2. The apparatus, as set forth in claim 1, wherein the control circuit comprises an oscillator coupled to the AC-to-DC converter operable to generate a gating control signal in response to the voltage level signal, the gating control signal changing the gated power supply frequency to substantially minimize the strobing.

3. The apparatus, as set forth in claim 1, wherein the current-to-voltage converter comprises a resistive element.

4. The apparatus, as set forth in claim 1, wherein the AC-to-DC converter comprises a bandpass filter.

5. The apparatus, as set forth in claim 1, wherein the AC-to-DC converter comprises a lowpass filter.

6. The apparatus, as set forth in claim 1, wherein the AC-to-DC converter comprises an integrator.

7. The apparatus, as set forth in claim 1, wherein the AC-to-DC converter comprises:
    a blocking diode coupled to the current-to-voltage converter;
    a capacitor coupled between a cathode of the diode and ground; and
    a resistor coupled in parallel with the capacitor.

8. The apparatus, as set forth in claim 1, wherein the control circuit comprises a phase-locked loop coupled to the AC-to-DC converter, the phase-locked loop including a voltage-controlled oscillator.

9. The apparatus, as set forth in claim 1, further comprising an amplifier coupled to the AC-to-DC converter operable to change the pulse width of the gating control signal.

10. The apparatus, as set forth in claim 1, wherein the control circuit comprises:
    a comparator coupled to the AC-to-DC converter and operable to generate a toggle signal in response to the voltage level signal being equal or exceeding a predetermined voltage level; and
    a counter circuit coupled to the comparator operable to count the number of toggle signals and generating a trigger signal supplied to the gate in response to the toggle signals.

11. Apparatus for controlling a gated power supply of an image intensifier having a micro-channel plate, comprising:
    a current-to-voltage converter coupled to the micro-channel plate operable to convert a current on the micro-channel plate to a voltage signal;
    a AC-to-DC converter coupled to the current-to-voltage converter operable to convert the voltage signal to a voltage level signal; and
    an oscillator coupled to the AC-to-DC converter operable to generate a gating control signal in response to the voltage level signal, the gating control signal changing the gated power supply frequency in response to a strobing of the current.

12. The apparatus, as set forth in claim 11, wherein the current-to-voltage converter includes a resistive element.

13. The apparatus, as set forth in claim 11, wherein the AC-to-DC converter includes a bandpass filter.

14. The apparatus, as set forth in claim 11, wherein the AC-to-DC converter includes a lowpass filter.

15. The apparatus, as set forth in claim 11, wherein the AC-to-DC converter includes an integrator.

16. The apparatus, as set forth in claim 11, wherein the AC-to-DC converter includes:
    a blocking diode coupled to the current-to-voltage converter;
    a capacitor coupled between a cathode of the diode and ground; and
    a resistor coupled in parallel with the capacitor.

17. The apparatus, as set forth in claim 11, further comprising a phase-locked loop coupled to the AC-to-DC converter, the phase-locked loop including a voltage-controlled oscillator.

18. The apparatus, as set forth in claim 11, further comprising an amplifier coupled the AC-to-DC converter operable to change the pulse width of the gating control signal.

19. A method of gating a power supply of a photocathode in an image intensifier having a micro-channel plate, comprising:
    sensing a strobing of a current in the micro-channel plate; and
    gradually varying the gating frequency of the gated power supply until the strobing is substantially eliminated.

20. The method, as set forth in claim 19, wherein gradually varying the gating frequency comprises gradually decreasing the gating frequency to a predetermined limit and gradually increasing the gating frequency until the strobing current is substantially eliminated.

21. The method, as set forth in claim 19, wherein gradually varying the gating frequency comprises gradually increasing the gating frequency to a predetermined limit and gradually decreasing the gating frequency until the strobing is substantially eliminated.

22. The method, as set forth in claim 19, further comprising:
    converting the current into a voltage signal;
    amplifying the voltage signal;
    converting the voltage signal to a voltage level; and
    generating an oscillating output supplied as a trigger signal to the gated power supply in response to the voltage level.

23. The method, as set forth in claim 19, further comprising:
    converting the current into a strobing voltage signal;
    amplifying the voltage signal;
    generating an oscillating output supplied as a trigger signal to the gated power supply in response to the voltage signal.

24. The method, as set forth in claim 19, further comprising:
  converting the current into a voltage signal;
  amplifying the voltage signal;
  converting the voltage signal to a voltage level;
  comparing the voltage level to a predetermined reference voltage level and generating a toggle signal in response to the voltage level being equal or exceeding the reference voltage level; and
  counting the number of toggle signals and generating a gating control signal operable to change the frequency of the gated power supply.

* * * * *

UNITED STATES PATENT AND TRADEMARK OFFICE
CERTIFICATE OF CORRECTION

PATENT NO.     : 6,429,416 B1
DATED          : August 6, 2002
INVENTOR(S)    : Jerry D. Porter It is certified that error appears in the above-identified patent and that said Letters Patent is hereby corrected as shown below:

<u>Title page,</u>
Item [73], Assignee, change "Northrop Grumman Corporation, Los Angeles, CA (US)" to -- Litton Systems, Inc. --.

Signed and Sealed this

Eighteenth Day of March, 2003

JAMES E. ROGAN
*Director of the United States Patent and Trademark Office*